United States Patent [19]
Walsh et al.

[11] 4,130,841
[45] Dec. 19, 1978

[54] VARIABLE FREQUENCY HALF-TONE IMAGING APPARATUS

[75] Inventors: Arthur M. Walsh, Pittsford; Frederick R. Ruckdeschel, Webster, both of N.Y.

[73] Assignee: Xerox Corporation, Stamford, Conn.

[21] Appl. No.: 775,130

[22] Filed: Mar. 7, 1977

[51] Int. Cl.² .................. H04N 1/04; H04N 1/22
[52] U.S. Cl. .................................. 358/298; 358/283
[58] Field of Search .................. 358/283, 298, 299

[56] References Cited

U.S. PATENT DOCUMENTS

| | | | |
|---|---|---|---|
| 3,294,896 | 12/1966 | Young | 358/283 |
| 3,549,798 | 12/1970 | Young | 358/283 |
| 3,739,084 | 6/1973 | Heinrich | 358/283 |

*Primary Examiner*—Howard W. Britton
*Attorney, Agent, or Firm*—J. J. Ralabate; C. A. Green; H. Fleischer

[57] ABSTRACT

An apparatus in which an original document is reproduced. The original document is scanned to determine the tonal graduations thereof and a signal generated indicative thereof. An image of the original document having a plurality of half-tone dot spacial frequencies is formed. Each half-tone dot spacial frequency is selected from a plurality of selected spacial frequencies corresponding to a pre-determined signal range. In this manner, the selected half-tone dot spacial frequencies are a function of the signal indicating the tone graduations of the original document.

7 Claims, 2 Drawing Figures

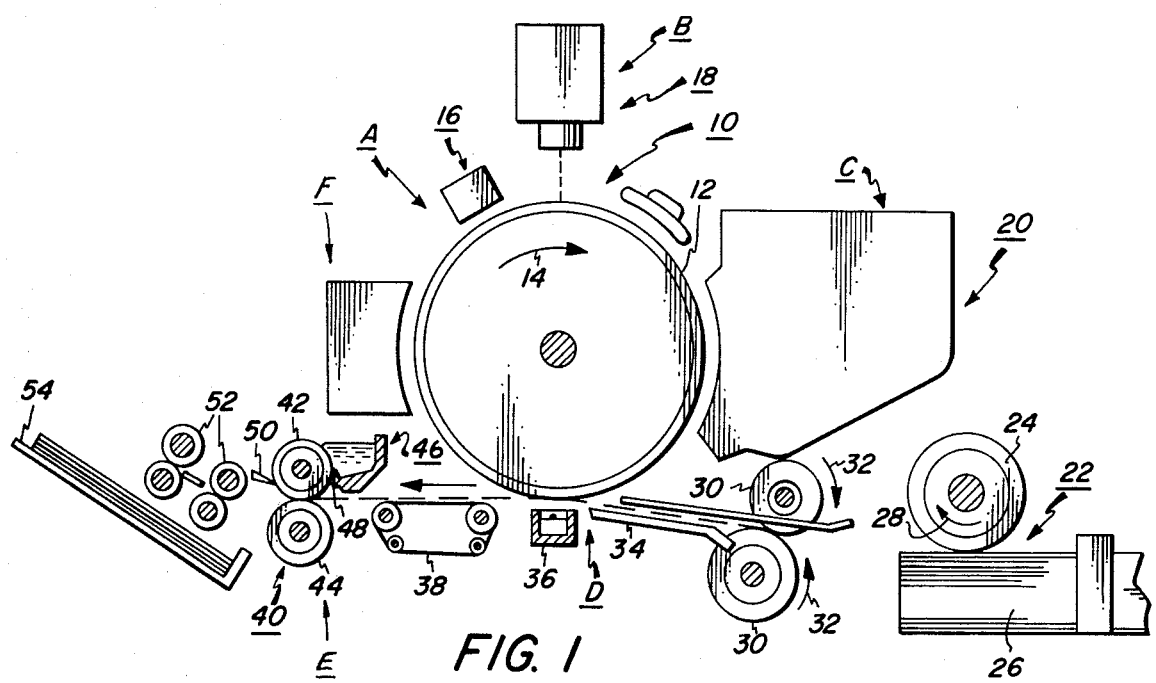
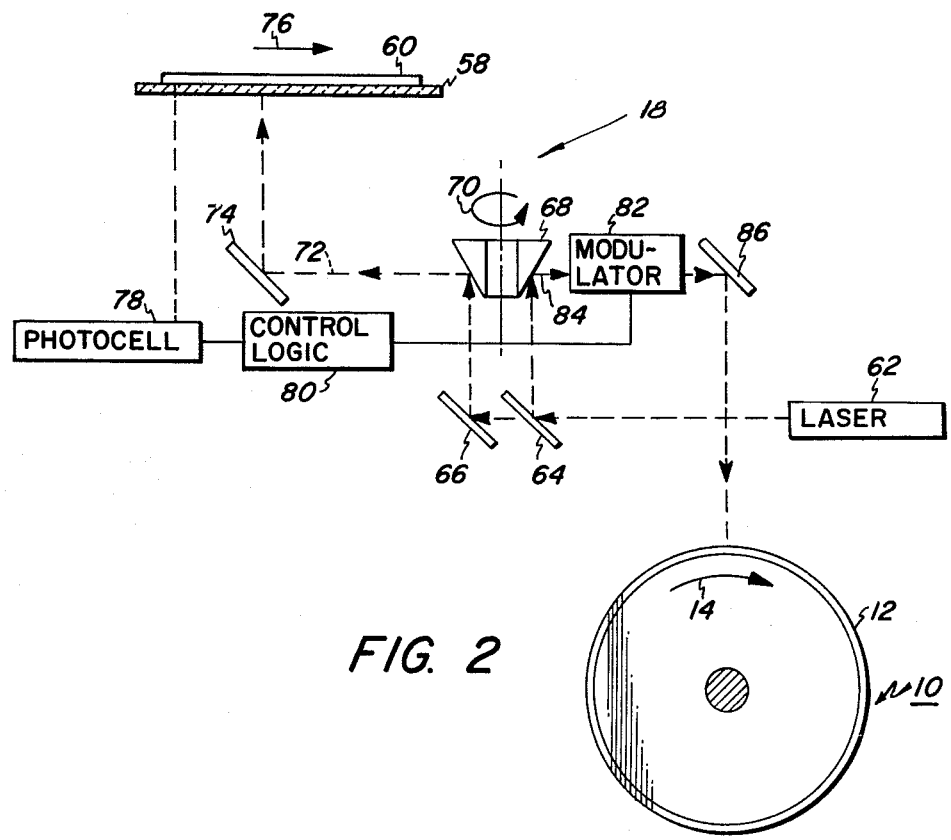

VARIABLE FREQUENCY HALF-TONE IMAGING APPARATUS

BACKGROUND OF THE INVENTION

This invention relates generally to an electrophotographic printing machine, and more particularly concerns a printing machine arranged to reproduce an original document as a copy having the half-tone dot frequency thereof dependent upon the tonal graduations of the original document.

In a typical electrophotographic printing machine, a photoconductive member is charged to a substantially uniform level. A light image of the original document irradiates the charged portion of the photoconductive member selectively dissipating the charge thereon. This records an electrostatic latent image of the original document on the photoconductive member. The electrostatic latent image is developed with charged particles. These particles are transferred from the latent image to a sheet of support material. Thereafter, the particles are permanently affixed to the sheet of support material forming a copy of the original document.

The usual method for producing half-tone images in electrophotographic printing comprises exposing the charged portion of the photoconductive surface through a half-tone screen. This may be accomplished by projecting a light image of the original document through the half-tone screen onto the charged portion of the photoconductive member. The characteristics of the screen are such that each element of the image is reproduced as a dot on the photoconductive member. The density of each dot is constant, however, the area of each dot varies as a function of the density of the corresponding element of the original document. Alternatively, the original document being reproduced is scanned by a photo-electric device which generates electrical signals varying in amplitude as a function of the density of the scanned element. These electrical signals may then be employed to modulate a light source exposing the charged portion of the photoconductive member so as to form a half-tone electrostatic latent image thereon.

Generally, the number of dots of a half-tone screen remains substantially constant. However, U.S. Pat. No. 3,666,479 issued to Wiese in 1972 discloses a half-tone screen having a different number of dots in different tonal areas. This screen may be employed to form a contact print. As taught therein, the light areas of the screen have smaller and fewer dots than the darker areas. U.S. Pat. No. 3,622,690 issued to Stephens in 1971 discloses an electronic color scanner employing a laser that simultaneously functions to scan the original pattern as well as to provide the light for producing color separations. The laser beam is modulated to produce varying size pulses corresponding to the tones in the original pattern and to provide screen color separations of the original pattern. U.S. Pat. No. 3,806,641 issued to Crooks in 1971 discloses a scanner which initiates the conversion of a continuous tone image into a half-tone reproduction thereof. The half-tone dots are of different sizes and correspond to different gray scale tones.

For high quality electrophotographic printing, it is necessary to utilize half-tone imaging in order to extend the range of the process and to provide uniform development. Unfortunately, half-tone imaging degrades the image, especially in terms of resolution, due to the dot structure being perceived by the observer. One solution is to employ finer half-tone dot images in which the dot structure is not apparent visually. Unfortunately, the development process employed in electrophotographic printing is not of sufficiently high quality to permit acceptable uniform development of high frequency, small size dots. For example, extremely uniform areas can be developed by using a 300 dot per inch image spacial frequency provided the optical density of the image area is 0.7. However, if the image area is a highlight region with a density of less than 0.2, a 300 dot per inch spacial frequency does not give uniform development. Uniform development could be obtained with a half-tone dot frequency of 150 dots per inch or less.

Accordingly, it is the primary object of the present invention to improve the electrophotographic printing process by producing half-tone images having a variable spacial frequency dependent upon the tonal graduations of the original document being reproduced.

SUMMARY OF THE INVENTION

Briefly stated, and in accordance with the present invention, there is provided an apparatus for reproducing an original document.

Pursuant to the features of the invention, the reproducing apparatus includes means for scanning the original document to determine the tonal graduations thereof. The scanning means generates a signal indicative of the tonal graduations of the original document. In response to the signal from the scanning means, image forming means generate an image of the original document having a plurality of half-tone dot spacial frequencies. Each half-tone dot spacial frequency is selected from a plurality of pre-selected frequencies. The pre-selected half-tone dot spacial frequencies correspond to pre-determined signal ranges.

BRIEF DESCRIPTION OF THE DRAWINGS

Other objects and advantages of the present invention will become apparent upon reading the following detailed description and upon reference to the drawings, in which:

FIG. 1 depicts a schematic elevational view of an electrophotographic printing machine incorporating the features of the present invention therein; and FIG. 2 illustrates the half-tone image generator employed in the FIG. 1 printing machine While the present invention will hereinafter be described in connection with the preferred embodiment and method of use therefor, it will be understood that it is not intended to limit the invention to that embodiment and method of use. On the contrary, it is intended to cover all alternatives, modifications, and equivalents as may be included within the spirit and scope of the invention as defined by the appended claims.

DETAILED DESCRIPTION OF THE INVENTION

For a general understanding of an electrophotographic printing machine in which the features of the present invention may be incorporated, reference is made to FIG. 1 which depicts schematically the various components thereof. Hereinafter, like reference numerals will be employed throughout to designate identical elements. Although the half-tone imaging apparatus of the present invention is particularly well adapted for use in an electrophotographic printing machine, it should become evident from the following discussion that it is equally well suited for use in a wide variety of printing devices and is not necessarily limited to the particular embodiment shown herein.

Inasmuch as the general operation of electrophotographic printing machines is well known, the various processing stations for producing a copy of an original will be represented in FIG. 1 schematically. Each processing station will be described hereinafter briefly.

Referring now to FIG. 1, the electrophotographic printing machine employs a drum 10 having a photoconductive surface 12 entrained about and secured to the exterior circumferential surface of a conductive substrate. As drum 10 rotates in the direction of arrow 14, it passes through the various processing stations disposed about the periphery thereof. A suitable photoconductive material may be of a type of selenium alloy described in U.S. Pat. No. 2,970,906 issued to Bixby in 1961. Preferably, the photoconductive material is secured to an aluminum substrate.

Initially, drum 10 rotates a portion of photoconductive surface 12 through charging station A. Charging station A includes a corona generating device, indicated generally by the reference numeral 16, positioned closely adjacent to photoconductive surface 12. Corona generating device 16 charges photoconductive surface 12 to a relatively high substantially uniform potential. A suitable corona generating device is described in U.S. Pat. No. 2,836,725 issued to Vyverberg in 1958.

Next, drum 10 rotates the charged portion of photoconductive surface 12 to exposure station B. Exposure station B includes a half-tone imaging apparatus, indicated generally by the reference numeral 18, for producing a image of the original document and projecting this image as half-tone dots onto the charged portion of photoconductive surface 12. The spacial frequency of the half-tone dot image is a function of the tonal graduations of the original document. The detailed structure of half-tone imaging apparatus 18 will be described hereinafter with reference to FIG. 2. In this manner, the half-tone image projected onto the charged portions of photoconductive surface 12 selectively discharges the charge thereon. This records an electrostatic latent image on photoconductive surface 12 corresponding to the informational areas contained within the original document.

Thereafter, the electrostatic latent image recorded on photoconductive surface 12 is rotated to development station C. At development station C, a developer unit 20 having a housing with a supply of developer mix contained therein renders the electrostatic latent image visible. The developer mix comprises carrier granules having toner particles adhering thereto. The carrier granules are formed from a magnetic material while the toner particles are usually made from a heat settable plastic. Preferably, developer unit 20 is a magnetic brush development system. In a system of this type, the developer mix is brought through a directional flux field forming a brush thereof. The brush of developer mix contacts the electrostatic latent image recorded on photoconductive surface 12. The latent image attracts electrostatically the toner particles from the carrier granules to form a toner powder image on photoconductive surface 12.

With continued reference to FIG. 1, the sheet of support material is advanced by sheet feeding apparatus 22 to transfer station D. Sheet feeding apparatus 22 includes a feed roll 24 contacting the uppermost surface of the stack of sheets of support material 26. Feed roll 24 rotates in the direction of arrow 28 to advance the uppermost sheet from stack 26. Registration roller 30, rotating in the direction of arrow 32, aligns and forwards the advancing sheet of support material into chute 34. Chute 34 directs the advancing sheet of support material into contact with drum 10 in a timed sequence so that the toner powder image developed therein contacts the advancing sheet of support material at transfer station D.

Transfer station D includes a corona generating device 36 which sprays ions onto the side of the sheet of support material opposed from photoconductive surface 12. The toner powder image adhering to photoconductive surface 12 is then attracted therefrom to the surface of the sheet of support material in contact therewith. After transferring the toner powder image to the sheet of support material, endless belt conveyor 38 advances the sheet of support material to fixing station E.

Fixing station E includes a fuser assembly, indicated generally by the reference number 40. Fuser assembly 40 heats the transferred toner powder image to permanently affix it to the sheet of support material. Preferably, fuser assembly 40 includes a heated fuser roll 42 and a backup roll 44. The sheet of support material with the toner powder image thereon, is interposed between fuser roll 42 and backup roll 44 with the toner powder image contacting fuser roll 42. Release material applicator 46 applies release material to fuser roll 42. After the toner powder image is permanently affixed to the sheet of support material, stripper blade 50 separates the sheet of support material from fuser roll 42. Thereafter, the sheet of support material is advanced by a series of rollers 52 to catch tray 54 for subsequent removal from the printing machine by the operator.

Invariably, residual toner particles remain adhering to photoconductive surface 12 after transferring the toner powder image to the sheet of support material. These residual particles are removed from photoconductive surface 12 at cleaning station F. Cleaning station F includes a cleaning mechanism, generally designated by the reference numeral 56, having a corona generating device and brush contacting photoconductive surface 12. Initially, the toner particles are brought under the influence of the corona generating device to neutralize the electrostatic charge remaining on the photoconductive surface 12 and that of residual toner particles. Thereafter, the neutralized toner particles are removed from photoconductive surface 12 by the rotatably mounted fibrous brush in contact therewith. After cleaning, a discharge lamp floods photoconductive surface 12 to return it to the initial charge level prior to the recharging thereof at station A for the initiation of the next successive imaging cycle.

It is believed that the foregoing description is sufficient for purposes of the present application to illustrate the general operation of an electrophotographic printing machine which exemplifies one type of printing machine employing the present invention therein.

Referring now to the specific subject matter of the present invention, FIG. 2 depicts an elevational view of the half-tone imaging apparatus employed in the FIG. 1 printing machine. The half-tone imaging apparatus 18 has a transparent platen 58 supporting original document 60 thereon. Laser 62 projects a beam onto beam splitter 64. Beam splitter 64 forms two beams, a read beam and a write beam. Mirror 66 reflects the read beam into scanner 68 and beam splitter 64 reflects the write beam into scanner 68. Preferably, scanner 68 is a truncated polygon having a multi-faceted reflecting surface so as to project a read plane across incremental widths of original document 60 and a write plane across incremental widths of photoconductive surface 12. By way of example, scanner 68 may have twelve facets. The number of facets and angular velocity of scanner 68 define the number of lines scanned per revolution. A motor rotates scanner 68 in the direction of arrow 70. Read beam 72 is reflected by mirror 74 onto original document 60 through transparent platen 58. As scanner 68 rotates, read beam 72 moves in a plane normal to arrow 76. This defines a read plane. Original document 60 moves in the direction of arrow 76 so that successive incremental widths thereof may be scanned by read beam 72. The read beam reflected from original document 60 is sensed by reflection detector 78. Preferably, reflection detector 78 is a photocell which develops an electrical output signal indicative of the informational areas contained within the original document. The output from the photocell varies as a function of the tonal graduations of the original document. Thus, the magnitude of the electrical output signal from photocell 78 is dependent upon the tonal graduations of original document 60. The electrical output signal from photocell 78 is transmitted to control logic 80. Control logic 80 develops a control signal which has an amplitude varying as a function of the tonal graduations and a pulse rate which also varies as a function of the tonal graduations. Thus, if the output signal from photocell 78 is within a first predetermined range, control logic 80 develops a control signal having a predetermined magnitude and pulse rate. Similarly, if the electrical ouptut signal from photocell 78 is within a second predetermined range, control logic 80 develops a control signal having a second amplitude and a second pulse rate.

Control logic 80 uses a half-tone algorithm to produce a control signal for regulating modulator 82. The algorithm, a two dimensional function Sij, is generated from the following equation:

$$Sij = [\cos(2\pi i) + \cos(2\pi j)]$$

The terms i and j correspond to the x and y coordinates of the write beam on photoconductive surface 12 of drum 10. Control logic 80 sums the signal from photocell 78 with Sij and compares this resultant signal with a threshold value. The difference between the threshold value and the sum of Sij and the signal from photocell 78 is the control signal for regulating modulator 82. In this manner, the selected threshold value determines when laser 62 is energized and de-energized. A control signal is generated from control logic 80 when the sum of the signal from photocell 78 and Sij cross the threshold value. As long as i and j remain constant, the spacial frequency remains constant. However, the duration of the control signal pulse depends wholly on the sum of the read signal and Sij. The control signal spacial frequency may be varied by varying the increments for i and j as a function of the signal from photocell 78, i.e. the tonal graduations of the original document. Thus, control logic 80 adjusts i and j over a pre-determined range in response to the signal from photocell 78 varying over a pre-determined range. In this way, the frequency of the control signal will have discrete values for ranges of tonal graduations of the original document. This is achieved by adjusting i and j to different fixed values with each pre-selected value corresponding to a preselected range of tonal graduations, i.e. signal range from photocell 78.

Electro-optical modulator 82 has applied thereto write beam 84. Modulator 82 modulates write beam 84 in accordance with the signal derived from logic 80. Consequently, the beam transmitted through modulator 82 is a function of the control signal and varies as a function of the density of the tonal graduations of original document 60. In addition, the frequency of the beam transmitted by modulator 82 is also a function of the tonal graduations. Hence, the control signal effectively converted back into a laser beam at the prescribed spacial frequency. Modulator 82 receives the signal from logic 80 and controls the duration and spacial frequency of the transmission of the laser beam therethrough. Thus, the output of modulator 82 is a series of light pulses. The pulsing frequency and duration varies as a function of the control signal from logic 80. Inasmuch as the width of the write beam is small relative to each half-tone dot, half-tones are formed by several scans through each dot. For example, if the scan frequency is 500 lines per inch, the laser read beam would have to scan each half-tone unit cell about four times to generate a half-tone image having 133 dots per inch.

Preferably, modulator 82 is an electrical optical device which acts as a fast switch. Generally, a device of this type includes a crystal which reacts to an electrical field to transmit or not transmit light. Write beam 84 is reflected by mirror 86 onto the charged portion of photoconductive surface 12. Drum 10 rotates in the direction of arrow 14 in synchronism with the movement of original document 60 in the direction of arrow 76. By this, it is meant that the tangential velocity of drum 10 is equal to the linear velocity of original document 60. The rotation of scanner 68 in the direction of arrow 70 causes write beam 84 to scan across photoconductive surface 12, i.e substantially parallel to the longitudinal axis thereof defining a write plane thereon. In this manner, an incremental width of information is recorded on photoconductive surface 12 as an electrostatic latent image.

Since the threshold value determines when laser 62 is on or off, the laser beam does not necessarily pulse at a regular frequency. In the background or white areas, the laser beam will be continuously on, while in the high density or dark regions, the laser beam will be off. Regular pulsing will only occur in the mid-tones with the pulse rate being determined by the selected increments for i and j.

In recapitulation, it is evident that the half-tone imaging apparatus of the present invention is particularly well adapted for use in an electrophotographic printing machine. As described hereinbefore, the imaging apparatus produces an image having a half-tone dot pattern with variable spacial frequency. The spacial frequency of the dot pattern varies as a function of the tonal graduations within the original document. Thus, the spacial frequency of the half-tone dot pattern in the image is greater when the tonal graduations of the original document are darker while the spacial frequency of the half-tone pattern decreases as the tonal graduations within the original document decrease. In this way, the spacial frequency of the half-tone dot pattern within the copy varies as a direct function of the tonal graduations within the original document.

It is, therefore, evident that there has been provided in accordance with the invention, an electrophotographic printing machine that employs a half-tone imaging apparatus that fully satisfies the objects, aims, and advantages hereinbefore set forth. While this invention has been described in conjunction with a specific embodiment and method of use therefor, it is evident that many alternatives, modifications and variations will be apparent to those skilled in the art. Accordingly, it is intended to embrace all such alternatives, modifications and variations as fall within the spirit and broad scope of the appended claims.

What is claimed is:

1. An apparatus for reproducing an original document, including:
    a laser arranged to transmit a beam therefrom;
    means for splitting the beam into read and write beams;
    means for moving the read beam across the original document;
    means for detecting the intensity of the read beam transmitted from the original document and generating signals indicative of the tonal graduation of the original document;
    control logic arranged to produce a plurality of signals having different frequencies witheach frequency corresponding to different pre-determined ranges of signals from said detecting means; and
    an electro-optical modulator, coupled to said control logic, for modulating the write beam to form an image of the original document having a plurality of half-tone dot spacial frequencies with each half-tone dot spacial frequency being selected from a plurality of pre-selected spacial frequencies in response to the signal from said control logic being in a pre-determined range, each of the pre-selected spacial frequencies corresponding to differing pre-determined signal ranges.

2. An apparatus as recited in claim 1, further including a beam responsive recording means positioned to receive the modulated write beam so as to record thereon a half-tone latent image of the original document.

3. An apparatus as recited in claim 2, wherein said recording means includes:
    a photoconductive member; and
    means for charging at least a portion of said photoconductive member to a substantially uniform level, sensitizing the surface thereof to the write beam.

4. An apparatus as recited in claim 3, further including:
    means for developing the half-tone latent image recorded on said photoconductive member with toner particles to form a toner powder image thereon;
    means for transferring the toner powder image from the latent image to a sheet of support material; and
    means for affixing substantially permanently the toner powder image to the sheet of support material.

5. A method of reproducing an original document, including the steps of:
    transmitting a laser beam;
    splitting the laser beam into read and write beams;
    moving the read beam across the original document;
    detecting the intensity of the read beam transmitted from the original document;
    generating signals indicative of the tonal graduation of the original document;
    producing a plurality of signals having different frequencies with each frequency corresponding to different pre-determined ranges of signals corresponding to the tonal graduations of the original document; and
    modulating the write beam to form an image of the original document having a plurality of half-tone dot spacial frequencies with each half-tone dot frequency being selected from a plurality of pre-selected spacial frequencies in response to the signal frequency produced being in a pre-determined range, each of the pre-selected spacial frequencies corresponding to differing pre-determined signal frequency ranges.

6. A method as recited in claim 5, further including the steps of:
    charging at least a portion of a photoconductive member to a substantially uniform level; and
    projecting the modulated write beam onto the charged portion of the photoconductive member selectively dissipating the charge thereon to record a half-tone latent image of the original document.

7. A method as recited in claim 6, further including the steps of:
    developing the half-tone latent image recorded on the photoconductive member with toner particles to form a toner powder image thereon;
    transferring the toner powder image from the latent image to a sheet of support material; and
    affixing substantially permanently the toner powder image to the sheet of support material.

* * * * *